Figure 1:
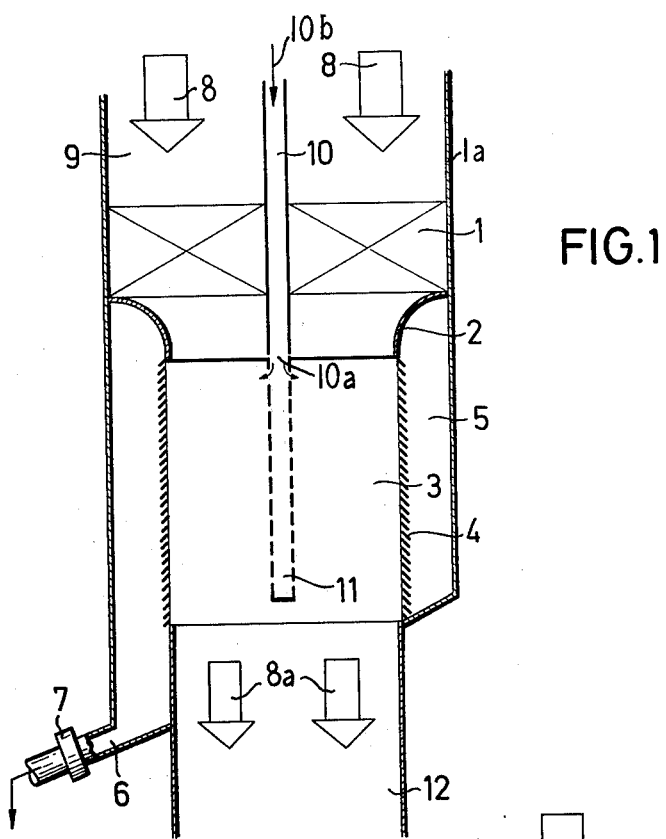

United States Patent [19]

Leschonski et al.

[11] 4,015,958
[45] Apr. 5, 1977

[54] WET CENTRIFUGAL SEPARATOR FOR GAS

[75] Inventors: Kurt Leschonski, Clausthal-Zellerfeld; Hans Rumpf, Karlsruhe, both of Germany

[73] Assignee: Kurt Leschonski, Germany

[22] Filed: May 20, 1976

[21] Appl. No.: 688,261

Related U.S. Application Data

[63] Continuation of Ser. No. 565,055, April 14, 1975, abandoned.

[30] Foreign Application Priority Data

Apr. 5, 1974 Germany ........................ 2416583

[52] U.S. Cl. .................................. 55/235; 55/238; 55/452; 55/453; 55/454; 55/455; 55/456; 55/457; 261/79 A

[51] Int. Cl.² ...................................... B01D 47/10

[58] Field of Search ...................... 55/92, 235-238, 55/452, 456, 457; 261/79 A

[56] References Cited

FOREIGN PATENTS OR APPLICATIONS 42,854 6/1909 Switzerland ........................ 55/238

980,724 1/1965 United Kingdom ................. 55/237
322,208 10/1970 U.S.S.R. ............................. 55/238

*Primary Examiner*—Bernard Nozick
*Attorney, Agent, or Firm*—Hill, Gross, Simpson, Van Santen, Steadman, Chiara & Simpson

[57] ABSTRACT

A mechanism for the removal of impurity particles from a gas for cleansing the gas including directing the gas in a circular axial flow through an elongate axially extending circular separator chamber; introducing liquid droplets at the inlet end of the chamber for capturing the particles, passing the droplets through a perforate wall on the chamber into an outer annular wall and removing the liquid from the outer chamber through an air lock valve. In one form the speed of the gas is increased at the location of the droplet introduction by a decrease in the annular size of the chamber, and in another form, the perforate collecting wall is tapered to diminish in size. The size of the chamber is such that the distance from the droplet introduction to the wall is no greater than 25 cm.

11 Claims, 2 Drawing Figures

U.S. Patent

April 5, 1977

4,015,958

WET CENTRIFUGAL SEPARATOR FOR GAS

This is a continuation of application Ser. No. 565,055, filed Apr. 14, 1975 now abandoned.

BACKGROUND OF THE INVENTION

The present invention relates to a mechanism for the separation of solid particles and other impurities from gases by capturing the particles in a cleansing liquid and removing the cleansing liquid.

More particularly, the invention relates to introducing the cleansing liquid in the form of fine droplets and causing a rotary motion in the gas collecting the droplets after a short travel, no more than 25 cm. through a perforate wall.

For the separation of solid particles suspended in gases, various devices have heretofore been used and known, and one type employs a venturi nozzle wherein the gas is passed through a channel which converges and then diverges with a separating liquid being introduced at the throat of the venturi. The separating liquid is drawn into the gas by the reduced pressure in the venturi throat, and the introducof liquid, therefore, depends upon the speed of the gas flowing through the venturi, and the vaporization of the liquid is dependent upon the speed of the flowing gas. In order to produce very small droplets well adapted for the separation of the particles from the gas, high speed is required for the reduced pressure necessary in the venturi. For this reason, devices heretofore used must be operated with high operating pressures to attain the necessary gas speed. The high speed which occurs in the venturi nozzle must be lowered in a defuser, and this causes defuser losses. These losses occur through the turbulent impulse exchange with the cleansing liquid. Lowering of the speed of the gas is not possible as the vaporization energy for vaporization of the separating liquid into fine droplets from the gas stream must be maintained. For the production of the high pressures needed to obtain the gas velocity required, energy consumption is required which increases the operating cost of these structures and make operation uneconomical.

A further disadvantage of the venturi type cleaners is that with decreasing gas flow, the vaporization of the droplets is decreased because the flow energy of the gases depends upon the maintenance of volume and velocity of the gas flow stream.

Further dust separating devices are known which include motor driven rotors rotating transversely of the stream of gas flow for the introduction of a cleaning liquid. These are arranged within a separating chamber having a relatively large cross-sectional floor area. For the attainment of high liquid drop discharge speeds which are necessary for separator chambers of large size so that the drops may penetrate through the gas flow reliably, relatively large drops are necessary, and rotors having appreciable circumferential speeds and size are necessary. This type of equipment involves costs for the apparatus as well as the costs of additional auxiliary structure including blades or vanes for creating a turbulence or rotation of the gases. The rotors located in the separating chambers and drive mechanism therefor require servicing and maintenance from time to time and represent a constant source of trouble and shut-down. Further, where the rotors are disposed transversely of the direction of flow, even where good flow conduit design is maintained, losses in pressure result which must be compensated for by additional equipment. Further, large droplets of liquid have a poor dust removal effect and require more water for a given amount of particle removal.

The present invention has as an object the elimination of the aforementioned difficulties and disadvantages of known dust removal devices and increasing the effectiveness and efficiency of dust removal particularly in being capable of cleansing particles from gas with equipment of much smaller structural size.

In the present invention the droplet sizes of the moisture, the speed of the droplets, and the speed of gas travel are controlled with respect to one another so that the flow of droplets from the time of exposure to the particles until capture and removal is no greater than 25 cm. in a direction radially of the gas flow direction. Further, the length of axial flow of the droplets from the time of engagement with the particles and the gas is no greater than 50 cm. With these relatively small sizes, the disadvantages of the high speeds of flow required for venturi cleansers as well as the mechanically expensive rotors required for rotary cleansers may be eliminated. In the present invention, the introduction of the droplets of cleansing liquid takes place by means of a stationary nozzle which creates a vaporization in very fine droplets. In one embodiment a two component hollow jet nozzle is advantageously used. The limitation to radial travel of no greater than 25 cm. and axial length of travel of no greater than 50 cm. requires an adaptation of the drop diameter and the entry speed of the drops into the gas in such a manner that even the smallest droplets be separated within the separating chamber on the inner surface of the separating chamber wall. An advantage of the very small structural volume of the separator of the present invention in contrast with conventional devices is the comparable volume penetrations of the gas to be cleansed.

The degree of separation of liquid drops increases with decreasing drop size. In a preferred embodiment of the present invention, particle separation is accomplished with droplets having an average size less than 100 microns. An average of this process is that not only the degree of separation increases with decreasing drop size, but an increasingly larger number of drops are produced from the volume of water. Particle separation is carried out with the drop size distribution such that fluctuations in drop size have no material influence on the degree of separation. At the same time with adjustment of operation and sizes and droplets less than 100 $\mu$m, the radial length of drop travel is a maximum of 25 cm. to reach the walls of the separating chambers, and this small travel is effective even with the involvement of larger drops of 10 $\mu$m.

In accordance with a further feature of the invention, it is provided that the gas to be cleansed receives a rotational movement before the entry of the cleansing liquid. This rotational flow has a number of advantages. With the same gas charge, not only is the resulting speed of the gas increased, but the centrifugal force favoring the separation of solids has an effect both on the particles as well as on the liquid droplets. Thus, the undesirable particles entering the separator chamber are forced outwardly and partially separated, and the smallest drops of liquid pass axially downwardly with rotational flow to a larger radius so that separation still occurs. In addition the droplets which are swept up in the rotational flow are moved in spiral paths through the separator chamber, and the passageway available for the separation is appreciably increased as contrasted with a gas flow which does not have a rotary motion.

In an embodiment of the invention, the axial speed of the gas after the introduction of the liquid particles is increased by means of a decrease in the flow cross-section. By means of this structure, the relative speeds between the droplets and the gas, which would otherwise decrease in a flight path without constriction, decreases less gradually or remains constant or actually again increases, thereby increasing the contact between droplets and particles and increasing the effective removal of both.

Figure 2:
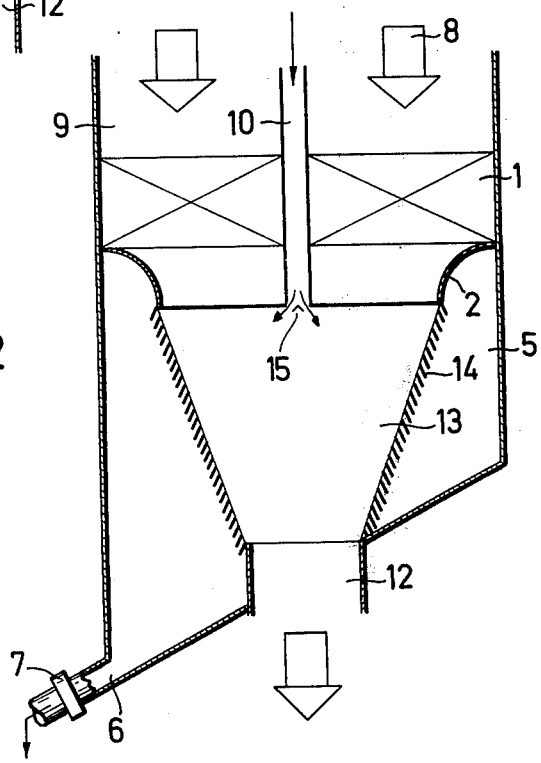

Further, with a constriction in the cross-sectional size of the separation chamber, smaller sizes of droplets may be separated off on the outer wall of the separator in larger quantities than in comparable cylindrical apparatus. The utilization of circular flow in a conical chamber brings the optimum separator results. This involves the advantages not only of the increasing gas speeds for the separation, but eliminates decrease in relative speed, and involves only a small decrease in the relative speed which may occur in a zone close to the outer wall where solids have increased because of the centrifugal force prevailing in the separator chamber, and this accordingly facilitates improved separation. In an embodiment of the invention, the separator has a rotational symmetrical separator chamber through which the air or gas flows axially. The diameter of the free space between the location of the introduction of the droplets in the wall of the separator amounts to less than 25 cm. In this construction a separator chamber results which is adapted for carrying out the method of the invention, and in which the introduction of the droplets of cleansing liquid is possible by means of a nozzle such that the droplets from the stationary nozzle reliably pass through the flowing gas to be cleansed, although they are extremely small. The utilization of nozzles thereby has the advantage over rotating mechanical devices which require bearings, drive elements and the like, and service-free elements are employed. A fouling or clogging of the droplet introduction nozzles is prevented by means of the filtration of the circulating cleansing liquid offering the advantage of a continuous automatic discharge of the separated particles and meeting the objectives of an installation which requires no servicing or attending personnel. In a vaporizing wheel or rotor separator type system, the discharge to the sump requires cleaning the sump from time to time. In the present separator, a filter can operate to automatically discharge filtered out solids automatically eliminating servicing and attendance.

In a further embodiment of the invention, it is provided that the separator chamber have a perforate outer wall through which the cleansing liquid droplets leave the separator chamber. This obtains the advantage that no liquid film is formed on the outer wall of the separator chamber which is required to take over the transportation of solids to a sump. This also eliminates the presence of a film of liquid which flows or collects in an uncontrollable manner along the outer wall to be possibly remixed with the gas flow. In the present invention, the droplets of water reach the outer wall of the separator and are discharged from the separator chamber and thereafter exert no unfavorable influences on the gas to be cleansed which flows within the chamber.

In one form of the invention, the perforate screened outer wall of the separator chamber may be constructed with a plurality of annularly extending slots such as may be provided by a plurality of stacked plates having spaces therebetween wherein the size of the slots is adapted to the flow behavior of the liquid carrying the removed particles.

In a form of the invention, in advance of the separator chamber, a stationary rotary gas flow producing structure is positioned. With axial flow of the gas, a rotation is produced for a distribution of speed of gases in the separator chamber more favorable for the separation without mechanical drive devices being necessary. In a form of the invention, the droplets are introduced through a nozzle-type construction. Thus, in advance of the separator chamber, a relatively high speed of flow of gas is produced, but the gas enters at a constant gas speed for contact with well distributed directed droplet flow. The supply nozzle for the cleansing droplets is located in the center of the chamber, and in one form, the droplet introducing nozzle may take the form of an elongate perforate tube coextensive with the separator chamber. This provides for an axial as well as a circumferential distribution of the droplets for contact with the particles in the gas.

In one form of the invention, the separator chamber wall is in the shape of a truncated cone, whose diameter decreases in the direction of flow of the gases. This advantageously increases the speed in which the air flow through the separator chamber in the direction of flow without having to provide flow control apparatus of an expensive type. The relative speed in the discharge part of the separator chamber where the larger part of captured particles have accumulated is increased so that the separator effect is further improved.

The hollow jet nozzle is constructed so as to provide its own droplet production so as to not rely on the surrounding environment of the gas and thereby an improved drop distribution is achieved as well as an extremely small droplet size of smaller than 100 $\mu$m. A dual nozzle or plural outlet nozzle is advantageous.

The perforate outer wall of the separator chamber may be provided by a plurality of annular plates having thin spaces therebetween. The plates may be angled slightly in the direction of flow of gas through the chamber so that the droplets of liquid with the captured particles continue to flow in substantially the same direction in which they flowed with the gas. Outwardly of the separator wall is the liquid collection chamber arranged with one or more liquid outlets. The water which leaves the separator chamber in droplet form is collected and may be returned to the system after passing through a filter arrangement so that a circulation with low losses of water results. The outlet of the water from the collection chamber, outwardly of the separation chamber, is provided with a gas flow prevention arrangement so that gases are not lost from the chamber.

Further objects, advantages and features, as well as equivalent structures and methods which are intended to be covered herein, will become more apparent with the teaching of the principles of the present invention in connection with disclosure of the preferred embodiments thereof in the specification, claims and drawings in which:

DRAWINGS

FIG. 1 is a somewhat schematic view showing a separator constructed and operating in accordance with the principles of the present invention; and FIG. 2 is a further schematic view of a separator illustrating another form of construction.

DESCRIPTION

In the separator of FIG. 1, the gas enters in an axial flow direction as indicated by the arrows 8. Suitable mechanism will be provided for causing the gas to flow axially at a controlled velocity and pressure. The gas flows into the inlet end of the cylindrical shaped separation chamber, and at the inlet end is a mechanism 1 which causes the gas to flow in a circular flow. This may be comprised of a plurality of angular blades or other stationary mechanism which directs the flow in an annular or spiral direction.

The flow chamber has an outer housing wall 1a, and this chamber is reduced in cross-section by a smooth constriction 2. This increases the velocity of flow at or just in advance of the introduction of droplets into the gas flow. The gas flowing through the chamber may be air or other type of gases containing dust or other particle impurities suspended therein with the impurities to be cleansed from the gas.

Following the constricting nozzle 2 is an annular outer separation chamber wall 4 defining an axially extending separation chamber 3 therein. The separator chamber wall is perforate for passing the droplets of liquid after the dust particles have been captured thereby, and the droplets flow outwardly into a liquid collection chamber 5 having a liquid outlet 6. The liquid outlet has a valve arrangement 7 which removes liquid from the chamber, but prevents the escape of air or gas from the separation chamber 3 and the outer liquid collection chamber 5.

Centrally located at the inlet end of the separation chamber 3 is an inlet 10a for the cleansing liquid. The cleansing liquid is supplied through a pipe 10 by suitable means such as a pressure schematically indicated by the arrowed line 10b. The opening or nozzle 10a is so constructed so as to discharge the relatively small droplets on the order of less than 100 μm. in size. The nozzle 10a is so located that it is centrally positioned within the separation chamber 3, and the separation chamber is of a diameter so that the distance from the nozzle 10a to the perforate wall 4 is less than 25 cm. The length of the perforate wall 4 is no greater than 50 cm.

As the air flows through the separation chamber, the droplets capture the particles therein and pass outwardly through the openings in the separator wall 4 and the cleansed air travels on through the mechanism at the discharge end as indicated by the arrowed lines 8a. A continued air discharge channel 12 is provided for carrying away the cleansed air.

As above stated, the liquid collection chamber 5 which is positioned annularly outwardly of the separation chamber wall 4 has a lock to prevent the escape of air which is inherent in the valve 7. For example, the valve may draw only a limited amount of liquid so that a liquid seal remains in the passage 6.

It is contemplated that for the handling of large quantities of air, a plurality of separators will be arranged in tandem. A separator identical to the one shown in FIG. 1 will be positioned following the illustrated separator having an inlet end connected to the conduit 12 and repeating the process provided by the mechanism which is illustrated. In the arrangement because of the requirement in accordance with the invention that the travel of the droplets be no greater than 25 cm. radially and no greater than 50 cm. axially, the individual separator cannot be expanded, but additional separators can be arranged in tandem to increase the capacity. Further, it is possible as above described to maintain constant use of the water by filtering and recirculation. It is also contemplated that additional separators may be arranged in parallel where additional quantity of air must be handled.

In the arrangement illustrated in FIG. 2, similar parts are numbered similarly, and the separator chamber is shown at 13. A dual nozzle arrangement is employed at 15 so that improved distribution and penetration occurs with improved capture of dust particles.

The separation chamber 13 is enclosed by conically shaped outer wall 14 so that as the air flow axially down through the separator, its velocity is increased. Thus, the droplets which tend to accumulate toward the downstream end of the separator after they have captured the dust particles, will be caught up in the increased velocity flow of air so as to enhance their passage through the separator wall 14. Similar to the arrangement in FIG. 1, the separator wall 14 is perforate, and this may be formed by a plurality of annular disks having thin slots therebetween with the slots angled in the direction of air flow through the separator chamber.

Thus, we have provided an improved structural arrangement which meets the objectives and advantages above set forth and which employs no moving parts. The construction is small, and reduces the size required. Further, with an absence of moving parts, mechanical maintenance and mechanical power consumption are substantially reduced.

We claim as our invention:

1. Apparatus for removing impurities from a flow of gas, comprising:
   a housing including an outer wall having a gas inlet and a gas outlet;
   cyclone means mounted in said gas inlet to impart a spiral direction to the incoming gas flow;
   constriction means in said housing adjacent and downstream of said cyclone means to increase the velocity of the gas flow;
   a separation chamber in said housing in communication with said constriction means and said outlet, said separation chamber including a perforate wall spaced from said outer wall of said housing forming a liquid collection chamber therebetween; and
   a liquid supply means including a spray nozzle centrally disposed in said separation chamber to spray droplets of cleansing liquid radially through the gas toward said perforate wall to capture impurities, said perforate wall passing the impurity-laden droplets into said liquid collection chamber.

2. The apparatus of claim 1, wherein said constriction means includes
   a wall having a smooth profile change radially and axially from one diameter to a smaller diameter in the direction of gas flow.

3. The apparatus of claim 1, wherein said perforate wall is conically tapered toward said gas outlet to further increase the velocity of the gas and enhance passage of the impurity-laden droplets through said perforate wall.

4. The apparatus of claim 1, wherein said nozzle means is constructed to spray liquid droplets of less than 100 μm.

5. The apparatus of claim 1, wherein said spray nozzle is spaced less than 25 cm from said perforated wall and said perforated wall extends no greater than 50 mm in the direction of gas flow.

6. The apparatus of claim 1, comprising:
a liquid outlet connected to said liquid collection chamber to remove the impurity-laden liquid.

7. The apparatus of claim 6, wherein said liquid outlet includes a valve.

8. Apparatus for removing impurities from a flow of gas, comprising:
a hollow housing of generally annular cross section including an outer wall having a gas inlet and a gas outlet;
cyclone means mounted in said inlet to impart a rotary motion to the flowing gas;
annular constriction means including an annular, curved wall extending radially and axially and having an outer diameter at one end and a smaller inner diameter at the other end, said outer diameter end connected to said outer wall of said housing adjacent said cyclone means, said constriction means increasing the velocity of the gas passing therethrough;
an annular perforate wall in said housing spaced from said outer wall to define a liquid collection chamber therebetween, said perforate wall having a first end connected to said inner diameter end of said annular, curved wall of said constriction means and a second end spaced no greater than 50 cm from said first end in the direction of gas flow and connected to said gas outlet; and
liquid supply means including a liquid conduit extending axially through said cyclone means and said constriction means and a spray nozzle connected to said liquid conduit and disposed within said annular perforate wall at a distance of less than 25 cm therefrom, said spray nozzle including means for forming a spray of droplets of less than 100 $\mu$m in size to capture the impurities in the gas and pass through the perforate wall into the liquid collection chamber.

9. The apparatus of claim 8, wherein said perforate wall is conically tapered toward said gas outlet to further increase the velocity of the gas and enhance passage of the impurity-laden droplets through said perforate wall.

10. The apparatus of claim 8, comprising:
a liquid outlet connected to said liquid collection chamber to remove the impurity laden liquid.

11. The apparatus of claim 10, wherein said liquid outlet includes a valve.

* * * * *